United States Patent [19]

Cook

[11] 3,729,650
[45] Apr. 24, 1973

[54] POTENTIAL-CURRENT TRANSFORMER DEVICE

[76] Inventor: Ralph H. Cook, 2319 Galpin Avenue, Royal Oak, Mich. 48073

[22] Filed: Feb. 7, 1972

[21] Appl. No.: 223,830

[52] U.S. Cl. ............................... 317/14 R, 317/15
[51] Int. Cl. ............................................ H02h 7/04
[58] Field of Search .............. 317/15, 14 R, 14 K, 317/14 A, 14 B, DIG. 6; 307/17

[56] References Cited

UNITED STATES PATENTS

| | | | |
|---|---|---|---|
| 1,809,895 | 6/1931 | Gay | 317/14 B |
| 3,366,839 | 1/1968 | Kind et al. | 317/15 |
| 1,874,407 | 8/1932 | Young | 317/14 A |
| 3,517,263 | 6/1970 | Okamura et al. | 317/14 R |
| 2,991,396 | 7/1961 | Schurr | 317/11 E |

*Primary Examiner*—James D. Trammell
*Attorney*—J. King Harness et al.

[57] ABSTRACT

The line potential and current measuring device consists of a standard or toroidal bushing current transformer, a desired number of cascaded current transformers connected in parallel with a series of precision or non-precision type grading impedance devices such as resistors, capacitors or the like alone or in conjunction with a low-loss potential transformer. This supplies electrical outputs which make the device suitable for accurately checking line potential and current on an indicating or recording instrument.

4 Claims, 2 Drawing Figures

Patented April 24, 1973 3,729,650

POTENTIAL-CURRENT TRANSFORMER DEVICE

BACKGROUND OF THE DISCLOSURE

Reference may be had to the patent to R. H. Cook et al, U.S. Pat. No. 3,315,147 to show a current sensing device for use with high voltage transmission conductors. It is well known that separate devices are used for measuring current and potential in high voltage alternating current circuits. The cost of such devices is substantially reduced when the potential and current measuring structures are combined and mounted in a single unit.

SUMMARY OF THE INVENTION

The invention relates to a potential and current sensing device for measuring high voltage line current and potential of a high voltage alternating current circuit. These measurements are between the high voltage line and ground potential. The novelty resides in having both the current and potential elements which are closely related and adjacent to each other, mounted in a hollow insulating bushing which provides protection against high potential alternating voltage and the weather.

DESCRIPTION OF THE PREFERRED EMBODIMENT

Figure 1:
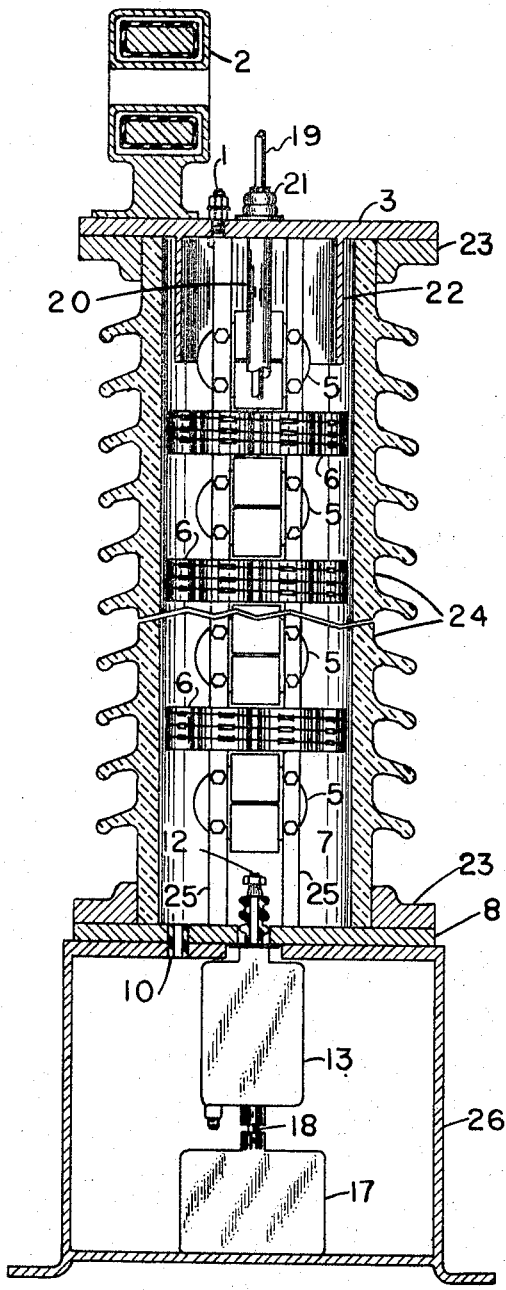
FIG. 1 is a cross sectional view of the potential and current measuring device showing the general construction and the internal components of the present invention.
Figure 2:
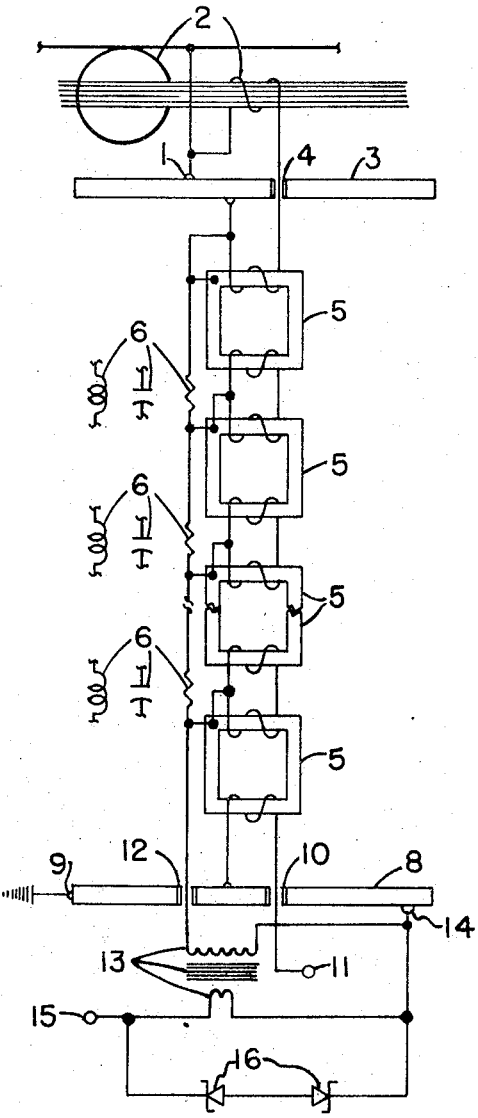
FIG. 2 is an electrical schematic view of the structure of FIG. 1.

It is usually the practice of providing separate devices for measuring current and potential for high voltage alternating current circuits. The cost of such devices are substantially reduced when the potential and current measuring structures are combined and mounted in a single unit as shown in the drawing wherein line voltage is applied to a terminal 1 while line current is sensed passing through the centrally-located hole in a toroidal bushing or conventional current transformer assembly 2. The terminal 1 is physically and electrically connected to a top plate 3, establishing this plate at line potential. The terminal 1 is also electrically connected to the secondary winding of the bushing current transformer 2. The output of this winding passes through an insulating bushing 4 inserted in the top plate 3. The secondary winding of the bushing current transformer is connected to the primary winding of the top one of a series of cascaded current transformers 5. The potential of the line, or top plate 3, is applied to the core of the top of the series of cascaded current transformers 5. A precision-type or non-precision-type impedance assembly 6 such as a resistor assembly, or capacitor assembly, 6 downgrades the line voltage. These impedance assemblies 6 are mounted on fluted support rings which allow the insulating oil or gas 7 to circulate and cool the assembly elements. The secondaries and primaries of successive current cascade transformers 5 from top to bottom of FIGS. 1 and 2 are interconnected as shown in FIG. 2; each successive current transformer core is maintained at the potential determined by the gradient produced by the impedance assembly on the low voltage side of the assembly 6 located immediately above. The bottom-most current transformer 5 of the cascaded series has one leg of its secondary winding connected to the bottom plate 8 which is electrically grounded through terminal 9. The remaining leg of the secondary winding of the bottom-most current transformer 5 has a lead which passes through an insulating bushing 10 in the bottom plate 8 and thence to terminal 11 in the lowest section of the device. The electrical lead from the lower end of the bottom-most impedance assembly 6 passes through an insulating bushing 12 in the bottom plate 8 and thence to the high voltage primary winding of the potential transformer 13. The other leg of the primary winding may or may not be grounded through terminals 14 and 9. The output of the low voltage secondary winding of the transformer 13 has one side grounded through terminals 14 and 9 and the other to terminal 15. The secondary winding of the transformer 13 is protected against voltage transients by a suitable means.

As illustrated at 16, a potential measuring device may be connected to the terminal 15 and to ground 9 to obtain a potential reading and a current measuring device may be connected to the terminal 11 and to ground 9 to obtain current readings. From these readings the actual potential and current in the high voltage line 2 is obtained.

The Device can be equipped with an operating mechanism 17 which can impart mechanical motion to rods passing through the porcelain insulator enclosure. The operating mechanism 17 can be housed in the same enclosure as the potential transformer 13. The operating mechanism 17 operated a pull-rod 18 which is connected to a yoke (not shown) which straddles 13 the potential transformer and moves two rods 19 which pass through two stationary tubes 20. The stationary tubes 20 pass part way through top plate 3 and bottom plate 8. The rods 19 project beyond the upper and lower surfaces respectively of top plate 3 and bottom plate 8. Bellows-type seals, or other means of sealing may be provided, 21 surround and form a seal against the rods. The other end of the bellows-type seals 21 are secured to plates 3 and 8 by means of foot plates of the bellows assembly and machine screws. Under the foot plates an O-ring is compressed to give an effective oil seal. Potential transformer 13 is mounted in the center of bottom plate 8 and has its primary winding's input terminal sealed into the cavity of the Potential — Current Transformer Device's center section by an O-ring or gasket seal bearing against the under-side of the bottom plate 8. An all-position screened air vent (not shown) is located in the bottom section. A vertically hinged and removable door which occupies one side face of the bottom section of the device provides access to the equipment inside. The door frame is gasketed to provide a weatherproof interior. A heat-sink cylinder 22 is located at the top of the center section of the device and is an integral part of top plate 3. Plates 3 and 8 are bolted to flanges 23 of the porcelain insulator assembly 24. Insulating oil 7, contained within the porcelain insulator, is prevented from leaking by O-ring seals (or other means of sealing) placed between the ground surfaces of extremities of the porcelain and the smooth surfaces of the plates 3 and 8 with which the insulator comes in contact. Current transformers 5 are supported by metal bands or other means attached to brackets bolted to four insulating material support rods 25 extending the full height of the porcelain insulator. Support rings for the resistor, capacitor or impedance assemblies 6 are slipped over the four rods 25 and the two tubes 20 housing the rods 19 during assembly sequence from bottom to top. A weatherproof enclosure for the bottom section of the device is 26.

The successive down-grading of the line voltage from top to bottom of the Device through the impedance assemblies results in a safe voltage (115 V) in the bottom section of the Device. This feature will permit maintenance and inspection in this area without interrupting the flow of main power the potential and current of which is measurable in the bottom section.

As the Potential — Current Transformer Device becomes associated with higher and higher line voltages, longer porcelain insulator sections are required in addition to a greater number of the cascaded current transformers and resistor, or capacitor or impedance assemblies to bring the potential within the bottom section of the Device to a safe level.

I claim:

1. In a system for measuring the current and potential in a high voltage A.C. line, a hollow insulator, a transformer supported by said insulator, a plurality of cascaded transformers supported within the insulator and connected to the transformer circuit, means for insulating said cascade transformers from each other, the secondary winding of each transformer being connected to the primary winding of the adjacent transformer, a first terminal connected to the primary windings of the last one of said cascade transformers, a plurality of series connected impedance elements connected in parallel to said cascade transformers, and a second terminal to which the end of said seriesed impedance is connected, whereby current measuring means connected to said first terminal and to ground obtains a current reading and potential measuring means connected to said second terminal and to ground obtains a potential reading.

2. In a system for measuring the current and potential as recited in claim 1, wherein a potential and current factor applied to said readings provides accurate readings for the potential and current in said high voltage A. C. line.

3. In a system for measuring the current and potential as recited in claim 1, wherein a transformer is connected at the bottom end of the seriesed connected impedance elements and to ground with the secondary winding connected to the second terminal and to ground.

4. In a system for measuring the current and potential in a high voltage A.C. line, a plurality of cascaded transformers, a plurality of seriesed impedance elements disposed in parallel with said cascaded transformers, an insulating housing containing said cascaded transformers and impedance elements, a current transformer having a primary subjected to the line current to be measured the secondary of which is connected to the primary of the adjacent cascaded transformer, the secondary of which and the other cascaded transformers being connected to the primary of the adjacent cascaded transformer, a first terminal connected to the secondary of the bottom-most cascaded transformer, a second terminal connected to the bottom end of the seriesed impedance elements, whereby a meter connected between the second terminal and ground will provide a potential reading which is proportional to that of the line, and a meter connected between the first terminal and ground will provide a current reading which is proportional to that of the line.

* * * * *